US010388126B2

(12) United States Patent
Gruenbaum et al.

(10) Patent No.: US 10,388,126 B2
(45) Date of Patent: Aug. 20, 2019

(54) METHOD FOR GUIDING PASSENGERS

(71) Applicant: SIEMENS MOBILITY GMBH, Munich (DE)

(72) Inventors: Joerg Gruenbaum, Erlangen (DE); Holger Last, Munich (DE); Roland Loskarn, Forchheim (DE); Roland Porsch, Speichersdorf (DE); Juergen Schlaht, Fuerth (DE)

(73) Assignee: Siemens Mobility GmbH, Munich (DE)

( * ) Notice: Subject to any disclaimer, the term of this patent is extended or adjusted under 35 U.S.C. 154(b) by 158 days.

(21) Appl. No.: 15/312,708

(22) PCT Filed: May 20, 2015

(86) PCT No.: PCT/EP2015/061037
§ 371 (c)(1),
(2) Date: Nov. 21, 2016

(87) PCT Pub. No.: WO2015/177178
PCT Pub. Date: Nov. 26, 2015

(65) Prior Publication Data
US 2017/0200355 A1    Jul. 13, 2017

(30) Foreign Application Priority Data

May 20, 2014 (DE) .................. 10 2014 209 554

(51) Int. Cl.
*G06Q 10/02* (2012.01)
*G08B 7/06* (2006.01)
(Continued)

(52) U.S. Cl.
CPC .............. *G08B 7/066* (2013.01); *B60N 2/002* (2013.01); *B61D 41/00* (2013.01);
(Continued)

(58) Field of Classification Search
CPC ......... G08B 7/066; H04N 7/181; H04W 4/80; H04B 5/0031; G06K 9/00838; G06Q 10/02; B60N 2/002; B61D 41/00; H04M 1/7253
See application file for complete search history.

(56) References Cited

U.S. PATENT DOCUMENTS 6,816,077 B1   11/2004  Shieh et al.
9,352,756 B2    5/2016  Grant
(Continued)

FOREIGN PATENT DOCUMENTS

CN   101035731 A   9/2007
CN   101056787 A   10/2007
(Continued)

*Primary Examiner* — Jayanti K Patel
*Assistant Examiner* — Shadan E Haghani
(74) *Attorney, Agent, or Firm* — Laurence Greenberg; Werner Stemer; Ralph Locher

(57) ABSTRACT

A method in conjunction with a passenger guidance system guides a passenger to a passenger seat disposed in a vehicle. In order to guide a passenger quickly and reliably to a passenger seat which corresponds to his needs and is disposed in a vehicle, and to improve the flow of passengers, it is proposed to determine occupation states of passenger seats of the vehicle and to guide the passenger to an unoccupied passenger seat. For carrying out the method, a passenger guidance system is proposed which has at least one device for determining the occupation state of passenger seats arranged in a vehicle, at least one evaluation device which is configured to determine a destination to which a passenger is to be guided, and a transmission device by which data which are suitable for indicating a path to the destination can be transmitted to at least one display device.

6 Claims, 5 Drawing Sheets

(51) Int. Cl.
  *B61D 41/00*   (2006.01)
  *B60N 2/00*    (2006.01)
  *H04M 1/725*   (2006.01)
  *G06K 9/00*    (2006.01)
  *H04W 4/80*    (2018.01)
  *H04B 5/00*    (2006.01)
  *H04N 7/18*    (2006.01)

(52) U.S. Cl.
  CPC ......... *G06K 9/00838* (2013.01); *G06Q 10/02* (2013.01); *H04B 5/0031* (2013.01); *H04M 1/7253* (2013.01); *H04N 7/181* (2013.01); *H04W 4/80* (2018.02)

(56) References Cited

U.S. PATENT DOCUMENTS

2007/0001904 A1   1/2007   Mendelson
2008/0041669 A1   2/2008   Sansevero et al.
2011/0082714 A1   4/2011   Gaikwad
2014/0125355 A1*  5/2014   Grant ............... B64D 11/06
                                              324/629
2014/0163860 A1*  6/2014   Chiantera .......... G06Q 10/02
                                              701/400
2015/0073842 A1*  3/2015   Aljabarti .......... G06Q 10/02
                                              705/5
2016/0140775 A1*  5/2016   Ekberg ............. G06Q 20/04
                                              705/13
2016/0311348 A1* 10/2016   Watson ............. H04L 67/125

FOREIGN PATENT DOCUMENTS

DE   102010033624 A1   2/2012
EP      1236609  A1    9/2002
EP      2351662  A1    8/2011
EP      2730479  A1    5/2014
WO     2006029949 A2   3/2006

* cited by examiner

METHOD FOR GUIDING PASSENGERS

BACKGROUND OF THE INVENTION

FIELD OF THE INVENTION

The invention relates to a method for guiding a passenger to a passenger seat arranged in a vehicle, and to a passenger guidance system for carrying out said method.

For today's passengers it is often irksome to find a passenger seat corresponding to their needs in vehicles such as trains or ships, for example. Until now they have boarded the vehicle and made their way through the vehicle in their search for a suitable passenger seat. This search process is time-consuming and inconvenient for the passenger. Moreover, it leads to considerable passenger movements through a vehicle which detrimentally affect passenger flow through the vehicle. This is the case in particular at times of increased passenger numbers. Furthermore, passengers that have already taken their passenger seats are disturbed by the search movements of newly boarded passengers. Even for a passenger that has reserved a passenger seat, the search for his or her reserved seat is tedious and time-consuming. He or she is required to consult notices, for example car position indicators for trains, in order to obtain information about the arrangement of his or her reserved seat inside the vehicle and then to locate said seat with the aid of numbering systems affixed to the vehicle or attached to passenger seats, such as car numbers or seat numbers, for example. However, if there is a change in the car formation or a car is left out or replaced, due to a fault for example, then the reserved seat cannot be found.

BRIEF SUMMARY OF THE INVENTION

Against this background, the object underlying the present invention is to provide a method which enables a passenger to be guided quickly and reliably to a suitable passenger seat.

This object is achieved by means of a method having the features of the main method claim.

A further object underlying the invention is to provide a passenger guidance system by means of which a passenger can be guided quickly and reliably to a suitable passenger seat.

This object is achieved by means of a passenger guidance system having the features of the independent object-related claim.

Advantageous developments are the subject matter of respective dependent claims.

The inventive method for guiding a passenger to a passenger seat arranged in a vehicle provides for coupling a near-field communication device arranged in the vehicle to a mobile device of the passenger, transmitting passenger-specific journey data from the mobile device to the near-field communication device, synchronizing the passenger-specific journey data with data of a passenger seat management system and determining the most suitable unoccupied passenger seats for said passenger, and guiding the passenger to at least one of said determined, unoccupied passenger seats.

By a vehicle in the present sense are to be understood essentially all types of land vehicles, water vessels and aircraft. The invention proves to be particularly advantageous in the case of vehicles designed for human mass transportation, such as trains, wide-bodied aircraft or cruise ships, for example. The concept of the passenger seat designates all spaces that can be occupied by a passenger, in particular standing room and seats. Basically, the invention can be applied without difficulty to one or more selected types of spaces occupied by passengers, to passenger seats only, for example.

The passenger can be guided by means of announcements or displays at vehicle stops and/or in the vehicle itself and/or on a mobile device of the passenger, for example a smartphone or a tablet computer.

In addition to enabling the passenger to be guided quickly and reliably, the invention allows optimal utilization of vehicle capacities. If the passenger is guided, at least among other means, by means of announcements or displays at the stop, passenger flows can be managed at an early stage, and on the one hand passenger movements within the vehicle can be reduced further, while on the other hand the demands on the infrastructure of the stop can be mitigated. The demands on passenger attendants onboard the vehicle can also be lessened because the passengers are able to obtain information for themselves about unoccupied passenger seats.

In a preferred embodiment of the invention it is proposed that the occupation states of passenger seats of the vehicle are determined.

The occupation states of the passenger seats may be determined for example on the basis of an analysis of camera images and/or occupancy sensors of passenger seats, such as seat occupancy sensors, for example. Mass sensors constitute another possibility. The occupation state can be estimated from a comparison of the unladen mass of the vehicle with the currently measured mass.

Advantageously, the occupation states of all passenger seats of the entire vehicle are determined. In this way the above-cited advantages can be exploited to the greatest possible extent. Furthermore, the utilization of the capacity of the vehicle on different sections of track or at different times of travel can be measured. This data may be used to match vehicle capacities more effectively to demand or to introduce usage capacity dependent ticket prices or special offers at short notice at times of low usage of available seating capacity.

In an advantageous variant of the method, an occupancy level is calculated in each case for different areas of the vehicle. The passenger is then directed into such an area of the cited different vehicle areas in which a lower, preferably the lowest, occupancy level has been determined in comparison with at least one other of the cited different vehicle areas. In this way the passenger is guided into that vehicle area in which he or she will, with the greatest probability, find a passenger seat corresponding to his or her needs. Search movements can be further reduced in this way.

Reserved passenger seats are advantageously taken into consideration in the calculation of the occupancy levels to the effect that said seats are regarded as occupied.

A variant of the method provides that when occupancy levels are calculated, the occupancy levels of such passenger seats as fulfill seat specifications are calculated separately. In this way occupancy levels of different passenger seat categories can be displayed separately and the passenger can accordingly be directed in a more targeted manner. A seat specification may for example relate to the class of travel booked, a suitability of the seat for passengers with disabilities, whether a passenger seat is facing in or against the direction of travel, the position of a passenger seat, on an aisle or by a window for example, or the grouping of the passenger seat, for example as part of two- or four-seat group. Additionally or alternatively, further parameters may be taken into account as seat specifications, such as the WLAN connection or power supply of a seat, the presence of a table, the ambient noise level, or the lighting situation at the passenger seat, for example.

Advantageously, the occupancy levels are calculated before a next stop is reached and at the same time passenger movements to be expected at the next stop are taken into account. By means of announcements or displays at the next stop, the passengers boarding there can in this way already be directed according to the occupancy levels to be expected after the passengers disembarking at said next stop have alighted. The expected numbers boarding at the next stop can also be taken into account in this way and the boarding passengers can be guided more quickly. The passenger movements to be expected are preferably determined on the basis of historical disembarkation movements in different vehicle areas. Preferably, reservation data is also resorted to in order to determine the expected passenger movements. In addition or alternatively, the expected passenger movements may be determined by referring to images recorded by onboard interior-facing cameras, on which disembarking passengers are identified, and/or images taken by onboard exterior-facing cameras, on the basis of which the number of boarding passengers is estimated. Cameras already provided for safety or security monitoring purposes may be used as interior-facing cameras. The exterior-facing cameras may also be used for monitoring the stop.

Unoccupied, unblocked and unreserved passenger seats are preferably displayed to the passenger and offered to him or her for blocking. The passenger is then guided to the passenger seat that he or she has blocked or, if he or she has blocked several passenger seats, to the passenger seats blocked by him or her. This permits a reservation of a passenger seat at very short notice, as it were. As a result, the passenger can make his or her way unhurriedly and without crowding to the at least one passenger seat that he or she has blocked, possibly even while he or she is still outside the vehicle. Movement in the direction of the blocked passenger seat is still possible in particular when the passenger has initiated the blocking from outside the vehicle. Passenger movements inside the vehicle can be further reduced in this way.

Unoccupied, unblocked and unreserved passenger seats may be displayed and offered by means of suitable display and input devices at stops and/or in the vehicle and/or on the passenger's mobile device. Passenger seats that are faulty or cannot be used for other reasons are advantageously displayed as occupied so that the passenger is not directed to them.

Basically, all data relating to the passenger's journey can be taken into account as journey data, for example the destination, reservation data or the seat specifications described in more detail above. The concept of the passenger seat management system designates an electronic data processing system in which vehicle-specific and/or passenger-specific data may be stored, for example reservation data for passenger seats, the vehicle configuration, that is to say, the passenger seat arrangement, or passenger seat profiles for the individual passenger seats of the vehicle. Said passenger seat profiles may comprise for example details relating to parameters of seats, such as, for example, a seat's WLAN connection, its power supply, the prevailing ambient noise level, the existence of a table, the grouping arrangement of the seat, for example in a two- or four-seat group, the suitability of the passenger seat for passengers with disabilities, the position, for example on the aisle or by the window, the prevailing lighting situation, the arrangement in a separate compartment, or the orientation of the seat in or against the direction of travel. Historical occupancy and boarding data of the vehicle may also be stored in the passenger seat management system. Preferences of the respective passenger in terms of the passenger seat may be stored in the passenger seat management system as further passenger-specific data, for example. The class of the respective passenger seat may also be stored as vehicle-specific data.

The method is able to achieve the aforementioned object without the need to determine the occupation states of the passenger seats of the vehicle. If, that is to say, the passenger has reserved a seat, the reservation data is transmitted as passenger-specific journey data from the mobile device to the near-field communication device and synchronized with data of the passenger seat management system. In this case the current arrangement of the reserved passenger seat in the vehicle can be determined and the passenger can be directed to said reserved passenger seat. In order to guide the passenger to the reserved passenger seat, the latter can for example transmit an optical signal when the passenger is within visual range. The optical signal can consist in a flashing light, for example. Alternatively, the passenger can be directed to the reserved passenger seat by means of guiding pictorial indicators such as arrows or other icons on his or her mobile device. In the case of an existing passenger seat reservation, determining the suitable passenger seats is accordingly limited to identifying the location of the reserved passenger seat in the vehicle. The method can advantageously be used in particular in such vehicles in which all passenger seats are required to be reserved already at the time of purchasing the ticket.

If, on the other hand, the passenger has not reserved any passenger seat, the remaining passenger-specific journey data is synchronized with the data of the passenger seat management system and the most suitable passenger seats are determined. The passenger can then be guided to at least one of said determined passenger seats for example by all of the determined passenger seats located within visual range of the passenger transmitting an optical signal which for example can again consist in a flashing light. Alternatively and in addition, the determined passenger seats can be displayed on the passenger's mobile device and/or the passenger can be directed to the determined passenger seats by means of guiding pictorial indicators on the mobile device, such as arrows or other icons.

Advantageously, the passenger-specific journey data may be prioritized. By this is to be understood that the passenger specifies which of the journey data, for example which of the seat specifications, is of greater importance to him or her. This is then given preferential consideration in determining suitable passenger seats. This enables an optimally matched passenger seat to be determined for the passenger, even at high occupancy levels.

If a plurality of passenger seats can be determined, one of them, or if a group ticket is present, several of them, can be blocked in the above-described manner. The passenger is then directed to the blocked passenger seat.

Advantageously, at the time of determining the most suitable passenger seats for the passenger, those preferences of the passenger that are stored in the passenger seat management system are taken into account. In this way a passenger seat most closely matching the requirements and expectations of the passenger can be determined without the latter stipulating corresponding seat specifications and transmitting these as passenger-specific journey data to the near-field communication device.

In a variant of the method, after the coupling of the near-field communication device to the mobile device, position data of the near-field communication device is transmitted to the mobile device. The transmission is realized by means of the near-field communication device. The passenger is then guided by the mobile device on the basis of the transmitted position data of the near-field communication device to the at least one of the determined passenger seats. For this purpose the vehicle configuration of the vehicle can be stored on the mobile device, such that the path to the determined passenger seat can be determined by means of the mobile device on the basis of the transmitted position data. This enables the determined passenger seat to be located in an efficient manner. It is furthermore possible to receive position data of a plurality of near-field communication devices or other signal transmitters and to determine the position of the mobile device in space by trilateration, as well as to direct the passenger to the at least one determined passenger seat using said determined position.

The passenger guidance system according to the invention has at least one evaluation device which is configured to determine a destination to which a passenger is to be directed. Also provided is a transmission device by means of which data that is suitable for indicating a path to the destination may be transmitted to at least one display device. Additionally arranged in the vehicle is at least one near-field communication device which can be connected to at least one of the at least one evaluation device and which can be coupled to a mobile device of the passenger for the purpose of a data transmission.

Screens at a stop and/or screens at or in the vehicle are preferably provided as display devices. A mobile device of the passenger may also be used as a display device.

Advantageously, the evaluation device is configured to query data from a passenger seat management system. In the present context the concept of the passenger seat management system, like the concepts of the vehicle and the passenger seat, is to be understood in the sense explained hereinabove. Basically, all of the data stored in the passenger seat management system may be queried, for example the aforementioned data that can be stored in the passenger seat management system. In principle, the passenger seat management system may be integrated into the evaluation device.

The passenger guidance system preferably has at least one device for determining the occupation states of passenger seats arranged in a vehicle.

Preferably provided as the device for determining the occupation state is at least one element from a group consisting of a device for determining the mass of a vehicle or vehicle area, at least one camera at least partially covering a vehicle interior, and at least one seat occupancy sensor. The device for determining the mass of a vehicle or vehicle area may consist for example of an electronic pneumatic spring suspension controller. By means of the latter, the mass additionally loaded in a car, for example a car of a train, can be determined and the occupation state of said car can be deduced on the basis of a reference mass for persons of, for example, 65 kg. Such devices for determining the mass have proved beneficial in particular in the commuter traffic environment. Seat occupancy sensors offer the advantage of being able to determine the occupation of the seats accurately and reliably. However, the requirements with regard to equipment are comparatively high and it is not possible to determine the occupation state in terms of standing room in this way. Cameras are often already provided in newer generation vehicles for safety and security monitoring purposes, so they represent a low additional outlay for equipment. Particularly preferably, all of the cited elements are provided. Alternatively or in addition, other devices for determining the occupation state of the vehicle may also be provided in principle, turnstiles, for example.

If a camera is provided as the device for determining the occupation state, this is preferably connected to a computing device which is configured to determine the occupation state of passenger seats covered by the camera from the images recorded by the camera. A nanocomputer such as the Raspberry Pi may be provided for example as the computing device and be equipped with a corresponding computer program. Particularly preferably, a plurality of cameras of said type are provided, each of which determines the occupation state in a vehicle area, for example a car or a car area, of a train. In this way the occupancy level for different vehicle areas can be determined or calculated on the basis of said cameras and the computing devices associated therewith in the above-described manner.

The vehicle is advantageously provided with at least one exterior-facing camera. The number of passengers boarding at a stop can be estimated in the above-described manner by means of the images recorded by said camera.

Advantageously, the passenger guidance system has at least one display and input device that can be accessed by the passenger. Said device is connected to at least one of the at least one evaluation device. This enables the above-explained display and blocking of unoccupied passenger seats by the passenger. The at least one display and input device is preferably arranged in the vehicle and/or at a stop of the vehicle. Whereas the display and input devices arranged in the vehicle may be used by passengers that have already boarded, display and input devices arranged at the stop may be used by passengers waiting for the vehicle to arrive. Additionally or alternatively, a mobile device of the passenger may be used as a display and input device and for this purpose be connected temporarily to the at least one evaluation device. This can be realized for example by means of suitable embodiment of the transmission device. The passenger may then conveniently display determined passenger seats on his or her mobile device and block the same in a simple manner using his or her mobile device. In this case the mobile device may still be located at the stop and does not necessarily need to be already in the vehicle.

The passenger guidance system achieves the object cited in the introduction without a device for determining the occupation states of passenger seats arranged in the vehicle being an absolute requirement for this purpose. This is attributable in particular to the fact that said passenger guidance system is suitable for performing the above described method.

In the passenger guidance system a plurality of seats of the vehicle, preferably every seat of the vehicle, advantageously have a near-field communication device which can be coupled to the passenger's mobile device. In this way, position data of the near-field communication devices, or of the seat to be assigned in each case, can be transmitted to the mobile device. The passenger may then determine his or her position inside the vehicle and his or her path to the destination on the basis of the position data transmitted in each case. On his or her way through the vehicle, his or her mobile device can be coupled to the nearest near-field communication device in each case and track his or her position and his or her path inside the vehicle on the basis of the position data of the different near-field communication devices transmitted in chronological sequence. It is furthermore possible to receive the position data of a plurality of near-field communication devices or other signal transmitters and to determine the position of the mobile device, or of the passenger, in space continuously by means of trilateration. The passenger can then be guided on the basis of said constantly known position. Transmission modules using the standard for navigation in closed spaces introduced by the company Apple under the trade name iBeacon may be provided for example as signal transmitters.

In one embodiment variant, a separate evaluation device is provided for each near-field communication device. Said evaluation device may be arranged for example in the seat associated with said near-field communication device. In this way, the functions of the at least one evaluation device may be made available locally and onboard the vehicle such that a radio link to a stationary evaluation device can be dispensed with. For example, the data transfer to a stationary remote station may be limited in this way to a data transfer with the passenger seat management system and consequently the data volume to be transmitted over the radio link can be substantially reduced.

The above-described characteristics, features and advantages of this invention, as well as the manner in which these are realized, will become clearer and more readily understandable in connection with the following description of the exemplary embodiments, which are explained in more detail with reference to the drawings. Where appropriate, like-acting elements are labeled herein with the same reference signs. The invention is not limited to the exemplary embodiments illustrated in the figures—including not in relation to functional features. The description hereintofore as well as the following description of the figures contain numerous features which are repeated, in some cases combined into a plurality thereof, in the dependent claims. These features, as well as all other features disclosed above and in the following description of the figures, will, however, also be considered individually by the person skilled in the art and brought together to form meaningful further combinations. In particular, said features may in each case be combined individually and in any suitable combination with the method and/or the passenger guidance system of the independent claims.

DESCRIPTION OF THE INVENTION

Figure 1:
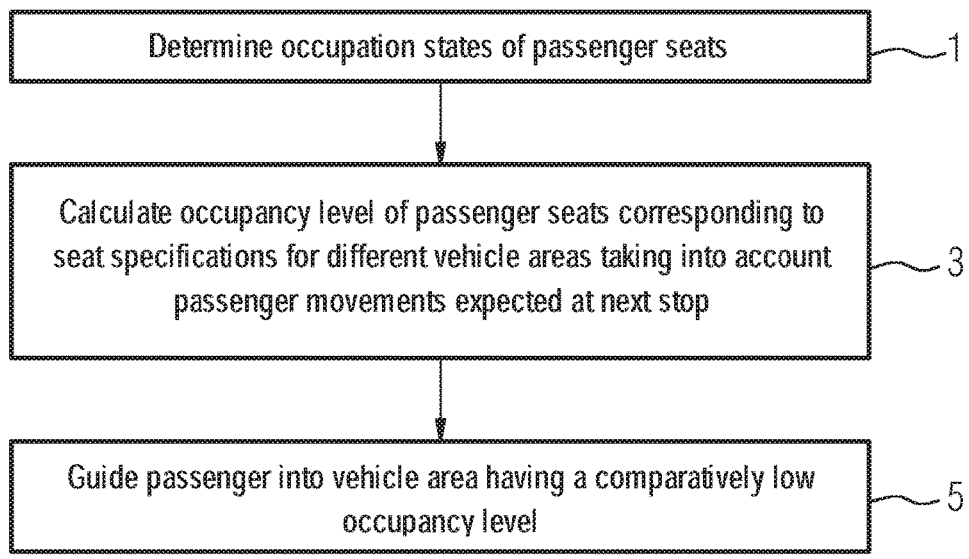
FIG. 1 shows a schematic diagram of a first exemplary embodiment of the method according to the invention.

FIG. 1 shows a schematic diagram of a first exemplary embodiment of the method according to the invention. This provides for determining occupation states of passenger seats of a vehicle 1. Advantageously, the occupation states of all passenger seats are determined in this case. Thereafter, the occupancy level of those passenger seats corresponding to certain seat specifications is calculated 3 for different vehicle areas. As explained hereinabove, among other criteria, the travel class booked, the suitability of a passenger seat for passengers with disabilities, etc. may be used as seat specifications. The calculation 3 of the occupancy levels for different vehicle areas is carried out before a next stop is reached. The passenger movements to be expected at the next stop are taken into account in this calculation 3. As explained in more detail hereinabove, the expected passenger movements can be determined inter alia on the basis of the evaluation of historical disembarkation movements in different vehicle areas or on the basis of images captured by exterior-facing cameras, by means of which the number of boarding passengers is estimated.

The passenger is then guided 5 into a vehicle area that has a lower occupancy level in comparison with other different vehicle areas. As has been explained hereinabove, the passenger can be directed by means of announcements of displays provided at a stop and/or in the vehicle and/or on a mobile device of the passenger.

Figure 2:
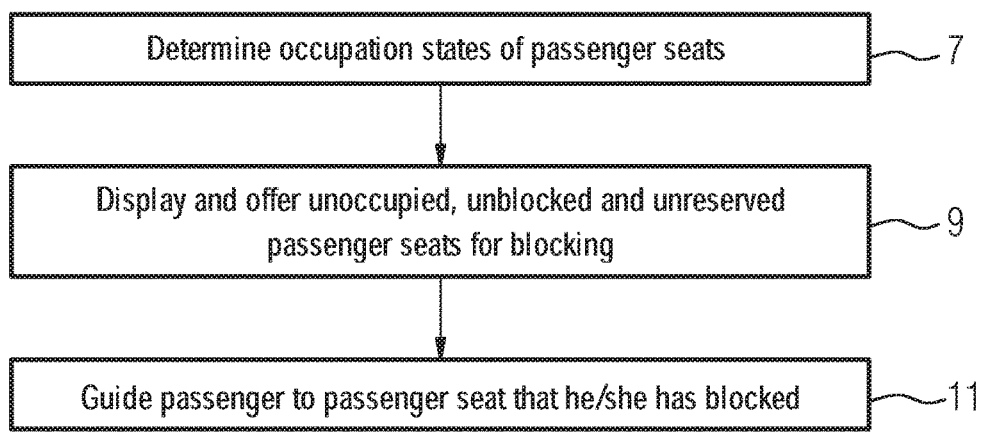
FIG. 2 shows a schematic diagram of a second exemplary embodiment of the method according to the invention.

FIG. 2 shows a second exemplary embodiment of the method according to the invention. According to the schematic diagram of FIG. 2, the occupation states of passenger seats arranged in the vehicle are once again determined 7 in the first instance. Next, passenger seats that are neither occupied nor reserved nor blocked are displayed to the passenger and offered for blocking 9. Passenger seats may be displayed and offered for blocking 9 for example by means of touch-sensitive screens, often referred to as touch panels or touch displays, which are arranged in the vehicle or at a stop, or by means of the passenger's mobile device. The passenger is then guided 11 to the passenger seat that he or she has blocked.

Figure 3:
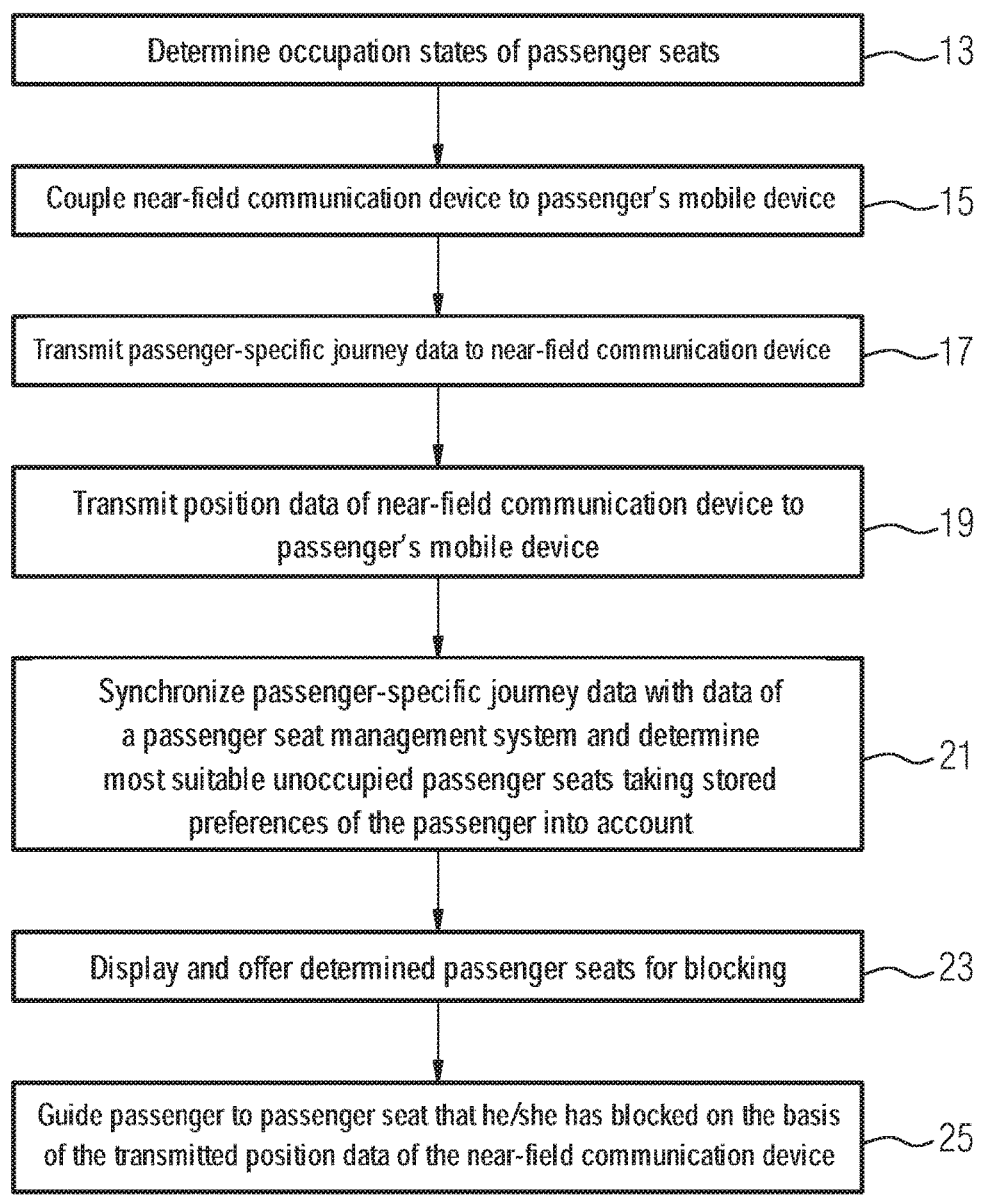
FIG. 3 shows a schematic diagram of a third exemplary embodiment of the method according to the invention.

In the exemplary embodiment of FIG. 3, the occupation states of the passenger seats are once again determined 13 in the first instance. Next, a near-field communication device arranged in the vehicle is coupled 15 to the passenger's mobile device. As a result of said coupling 15, passenger-specific journey data can subsequently be transmitted 17 to the near-field communication device. In the reverse direction, position data of the near-field communication device is transmitted 19 to the passenger's mobile device.

Following transmission 17 of the passenger-specific journey data to the near-field communication device, said journey data is synchronized with data of a passenger seat management system and then, taking the preferences of the passenger that are stored in the passenger seat management system into account, those unoccupied passenger seats are determined 21 that are most suitable against the background of the passenger-specific journey data and the preferences stored for that passenger. The passenger-specific journey data may consist of the above-explained seat specifications or other journey data described hereinabove, for example the travel destination or reservation data of the passenger.

The determined passenger seats are subsequently displayed to the passenger and offered for blocking 23. This may essentially be accomplished, analogously to the case shown in FIG. 2, by means of display and input devices arranged in the vehicle or at the stop. However, as the passenger's mobile device is in any case coupled, or at least may be coupled, to the near-field communication device, the determined passenger seats are preferably displayed and offered for blocking 23 to the passenger on his or her mobile device.

The passenger is then guided 25 to the passenger seat that he or she has blocked. This is carried out on the basis of the position data transmitted by the near-field communication device. With the aid of said position data, and if necessary further data previously transmitted to the mobile device, such as an available vehicle configuration, the mobile device is able for example to determine its position inside the vehicle or its position relative to the blocked passenger seat and to guide 25 the passenger to the blocked passenger seat.

Figure 4:
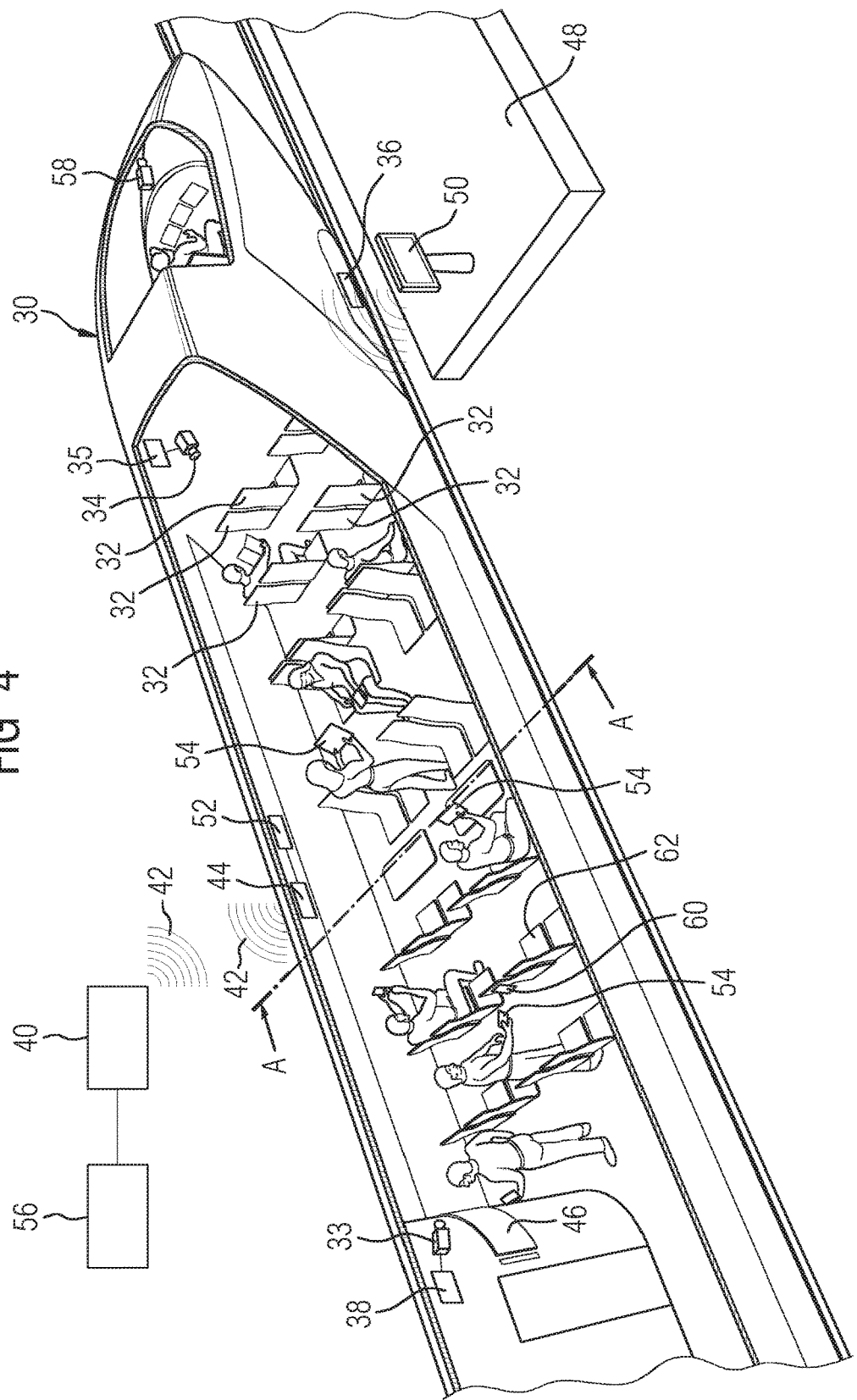
FIG. 4 shows a first exemplary embodiment of the passenger guidance system according to the invention in a schematic view.

FIG. 4 shows a schematic view of a passenger guidance system according to the invention. This is illustrated based on the example of a rail vehicle 30. In the exemplary embodiment depicted in FIG. 4, two cameras 33, 34, each of which is connected to a respective computing device 35 and 38, are provided as a device for determining the occupation state of passenger seats 32 arranged in the rail vehicle 30. Said computing devices 35, 38 are configured to determine the occupation state of passenger seats 32 covered by the respective camera 33, 34 from the images recorded by the cameras 33, 34. For greater clarity of illustration, not all of the passenger seats 32 depicted in FIG. 4 are labeled with reference signs. These are nonetheless readily recognizable as such to the viewer. The camera 33 covers those passenger seats 32 that are arranged to the left of the dividing line A-A in the schematic view of FIG. 4. The camera 35, on the other hand, covers the passenger seats 32 that are arranged to the right of the dividing line A-A in FIG. 4. The dividing line A-A accordingly separates two vehicle areas. The cameras 33, 34 can be utilized in addition for safety and security monitoring purposes.

The computing devices 35, 38 are connected to a transceiver unit 44 via an onboard network or, as in the case shown in FIG. 4, may be connected wirelessly at least temporarily to the transceiver unit 44 by radio link. In this way, the occupation state determined by the computing devices 35, 38 can be transmitted from the transceiver unit 44 over a radio link 42 to a stationary evaluation device 40 arranged outside the rail vehicle 30. Occupancy levels for the different vehicle areas may now be calculated by means of said evaluation device 40, where appropriate taking into account seat specifications and passenger movements to be expected at a next stop 48. A passenger already present onboard the vehicle or a passenger boarding at the next stop 48 can be guided, where appropriate taking into account seat specifications, on the basis of the results of said calculations into that vehicle area having the lower occupancy level. In order to enable the passenger movements that are to be expected at the next stop 48 into account, the rail vehicle 30 is provided with an exterior-facing camera 58. The number of passengers boarding at the stop 48 can be estimated with the help thereof.

In order to direct the passenger into the vehicle area having the lower occupancy level, said vehicle area is determined as the destination by the evaluation device 40. Data suitable for indicating a path to said destination is subsequently transmitted over the radio link 42 to the transceiver unit 44, which for its part transmits said data to a touch-sensitive screen 46 and to mobile devices 54 of the passengers. In this case the data is transmitted to the mobile devices 54 by means of a near-field communication device 52. In the present exemplary embodiment, the touch-sensitive screen 46 and the mobile devices 54 of the passengers accordingly represent display devices. The transceiver unit 44 and the near-field communication device 52 serve as transmission devices by means of which the data is transmitted to said display device. The data can be transmitted to the touch-sensitive screen 46 via the onboard network or, as in the case shown, wirelessly via radio link.

A touch-sensitive screen 50, which is likewise connected wirelessly via radio link to the evaluation device 40, is also provided at the next stop 48. Alternatively, a fixed landline connection may exist. Passengers can accordingly be guided already at the stop by means of the touch-sensitive screen 50 in the direction of the vehicle area having a lower occupancy level.

The evaluation device 40 is connected to a passenger seat management system 56 in order, when performing calculations, to be able to have access to historical boarding or occupancy data, vehicle configurations, in particular the passenger seat arrangement, or other data.

The touch-sensitive screens 46 and 50 constitute not only display devices, but combined display and input devices. Furthermore, they are indirectly connected wirelessly, at least temporarily, by radio link to the evaluation device 40, via the transceiver unit 44 in the case of the touch-sensitive screen 46. Both touch-sensitive screens 46, 50 are furthermore accessible to the passenger, thus enabling the latter to enter inputs on them. The passenger guidance system illustrated in FIG. 4 is consequently suitable not only for performing the method according to FIG. 1, but also for performing the method according to FIG. 2. Thus, after the occupation states have been transmitted to the evaluation device 40, those passenger seats that are unoccupied, unblocked and unreserved can be determined by the evaluation device 40 taking into account reservation data received from the passenger seat management system 56 and any faulty passenger seats as well as data relating to blocked passenger seats. In this case faulty passenger seats are rated as occupied. The passenger seats determined in the manner described are then transmitted to the touch-sensitive screens 46 and 50, displayed and offered for blocking. If the passenger blocks one of the offered passenger seats, he or she can then be guided to said passenger seat that he or she has blocked. In this case, as described hereinabove, the touch-sensitive screens 46, 50 and/or the passenger's mobile device 54 may be used as display devices.

In addition to the near-field communication device 52, a further near-field communication device 60 is provided in the rail vehicle 30 and is arranged in a seat 62. In FIG. 4, said further near-field communication device 60 is represented schematically outside of the seat 62 simply to make it more easily recognizable. Said near-field communication device 60, like the near-field communication device 52, is connected to the transceiver unit 44. For greater clarity of illustration reasons, said connection has not been depicted in FIG. 4. The passenger's mobile device 54 may be coupled to said near-field communication devices 54, 60 so that passenger-specific journey data as well as position data of the near-field communication device can be transferred in the manner presented in FIG. 3. The passenger-specific journey data can then be synchronized with data of the passenger seat management system 56 and the most suitable unoccupied passenger seats can be determined 21 in the evaluation device 40. The data required for this purpose can be transferred by means of the transceiver unit 44 and the radio link 42. In an analogous manner, the passenger seats determined by the evaluation device can be transmitted back to the transceiver unit. Passenger seats that have been determined can subsequently be displayed and offered for blocking by means of the touch-sensitive screen 46, though preferably the passenger's mobile device 54 is used. Said mobile device 54 is preferably also used for guiding 25 the passenger to the passenger seat that he or she has blocked. The passenger guidance system illustrated in FIG. 4 is therefore also suitable for performing the method according to FIG. 3.

The rail vehicle shown in FIG. 4 has an electronic pneumatic spring suspension controller 36 which may be used as a device for determining the occupation state. A further car of the rail vehicle shown in FIG. 4 is beneficially likewise equipped with an electronic pneumatic spring suspension controller of said type. The occupation states of the different cars may then be determined on the basis of the data acquired from the electronic pneumatic spring suspension controllers of the different cars and passengers can be directed into that car that has a lower occupancy level.

Figure 5:
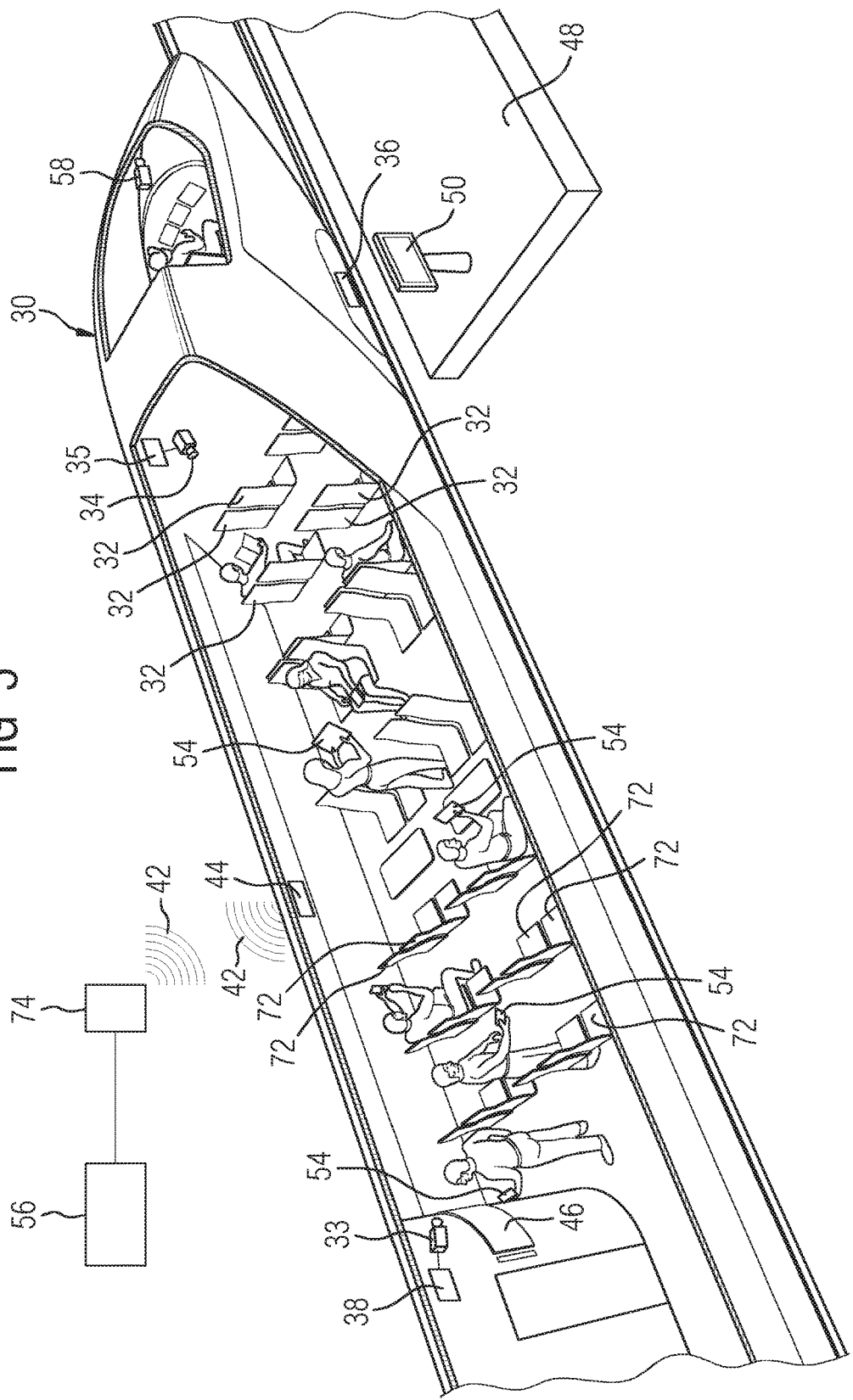
FIG. 5 shows a schematic view of a second exemplary embodiment of the passenger guidance system according to the invention.

FIG. 5 shows a further exemplary embodiment of a passenger guidance system. This differs from that shown in FIG. 4 in that no stationary evaluation device 40 is provided. Instead, every seat 72 of the rail vehicle 30 is provided with a near-field communication device 60 as well as an associated evaluation device 76. Passenger guidance requests can therefore be processed locally by each of the seats 72. The data transfer over the radio link 42 is limited to the data exchange with the passenger seat management system 56, which is connected to a transceiver unit 74 for this purpose. In this way the above-cited advantages of decentralized evaluation devices can be used.

Figure 6:
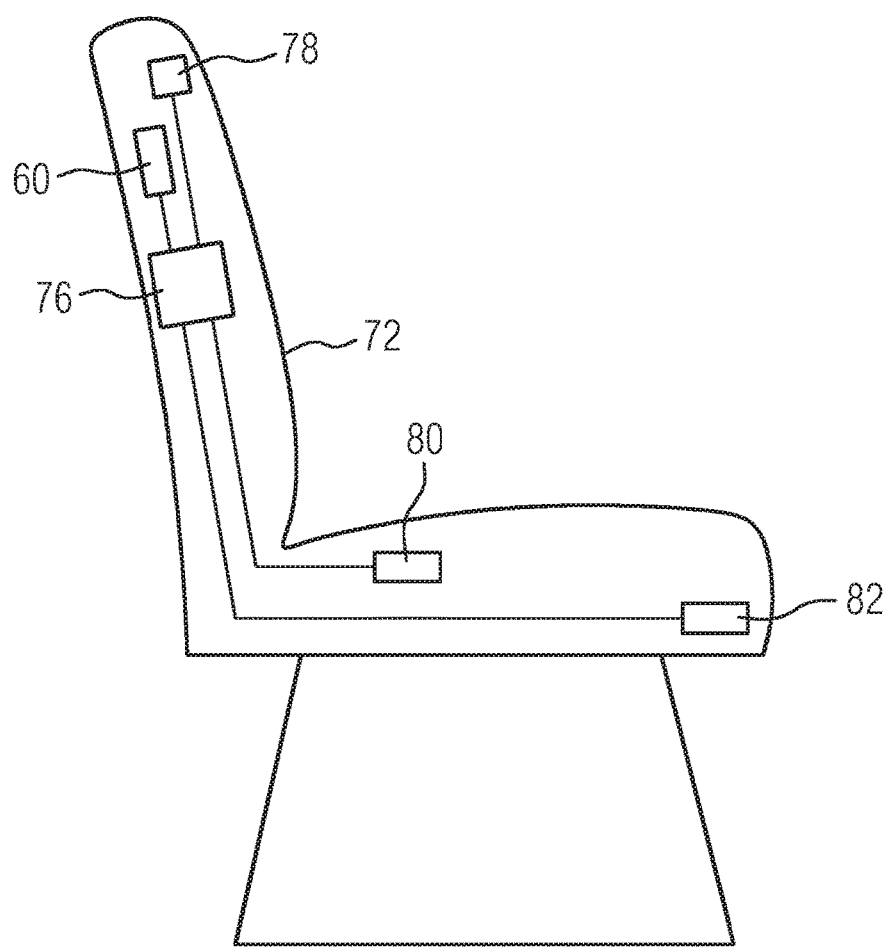
FIG. 6 shows a schematic view of a seat from FIG. 5.

A schematic illustration of the seats 72 from FIG. 5 can be found in FIG. 6. As well as the near-field communication device 60, the evaluation device 76 is recognizable herein. Additionally provided as sensors for environmental parameters of the seat 72 are a microphone and a temperature sensor 82. The ambient temperature and the ambient noise level of each individual seat 72 can be determined by means of said sensors and be taken into account when determining the passenger seat best suited to the passenger. The microphone 78 and the temperature sensor 82 are connected to the evaluation device 76, as also is a seat occupancy sensor 80. In the exemplary embodiment illustrated in FIG. 5, the occupation states of the seats 72 can be determined by means of the seat occupancy sensor 80 present in every seat 72. The occupation states determined by the cameras 33, 34 and the associated computing devices 35, 38 can be established with greater precision with the aid of the seat occupancy sensors 80. Depending on vehicle type, it can be considered whether to determine the occupation states of the passenger seats solely with reference to the seat occupancy sensors.

Although the invention has been illustrated and described in greater detail on the basis of the preferred exemplary embodiments, the invention is not limited by the disclosed examples and other variations may be derived herefrom by the person skilled in the art without leaving the scope of protection of the invention.

The invention claimed is:

1. A method for guiding a passenger to a passenger seat disposed in a vehicle, which comprises the steps of:
   coupling a near-field communication device disposed in the vehicle to a mobile device of the passenger;
   transmitting passenger-specific journey data from the mobile device to the near-field communication device;
   synchronizing the passenger-specific journey data with data of a passenger seat management system and most suitable unoccupied passenger seats are determined for the passenger;
   guiding the passenger to at least one of the most suitable unoccupied passenger seats;
   calculating an occupancy level in each case for different vehicle areas before a next stop is reached and when calculating the occupancy levels, taking passenger movements to be expected at the next stop into account; and
   guiding the passenger into one of cited different vehicle areas in which a lower occupancy level has been calculated in comparison with at least one other of the cited different vehicle areas.

2. The method according to claim 1, which further comprises determining occupation states of passenger seats of the vehicle.

3. The method according to claim 1, wherein in the calculating of occupancy levels, occupancy levels of the passenger seats are calculated which fulfill seat specifications.

4. The method according to claim 1, which further comprises:
   displaying unoccupied, unblocked and unreserved passenger seats to the passenger and offered for blocking by the passenger;
   guiding the passenger to the at least one passenger seat that he or she has blocked.

5. The method according to claim 1, which further comprises taking into account preferences of the passenger that are stored in the passenger seat management system in a determination of the most suitable passenger seats for the passenger.

6. The method according to claim 1, wherein after the coupling of the near-field communication device to the mobile device by means of the near-field communication device, performing the further steps of:
   transmitting position data regarding at least one determined passenger seat to the mobile device; and
   guiding the passenger by the mobile device on a basis of transmitted position data of the at least one of determined passenger seat.

* * * * *